(12) United States Patent
Liu et al.

(10) Patent No.: US 10,697,048 B2
(45) Date of Patent: Jun. 30, 2020

(54) ALLOY DRILL AND MANUFACTURING METHOD THEREOF

(71) Applicant: SEED TECHNOLOGIES CORP., LTD., Zhuzhou, Hunan (CN)

(72) Inventors: Bin Liu, Hunan (CN); Yuehua Xu, Hunan (CN); Ji Wu, Hunan (CN); Zhihua Cao, Hunan (CN)

(73) Assignee: SEED TECHNOLOGIES CORP., LTD., Zhuzhou, Hunan (CN)

( * ) Notice: Subject to any disclaimer, the term of this patent is extended or adjusted under 35 U.S.C. 154(b) by 0 days.

(21) Appl. No.: 15/770,751

(22) PCT Filed: Nov. 19, 2015

(86) PCT No.: PCT/CN2015/095050
§ 371 (c)(1),
(2) Date: Apr. 24, 2018

(87) PCT Pub. No.: WO2017/070993
PCT Pub. Date: May 4, 2017

(65) Prior Publication Data
US 2018/0305790 A1 Oct. 25, 2018

(30) Foreign Application Priority Data
Oct. 29, 2015 (CN) .......................... 2015 1 0719112

(51) Int. Cl.
*C22C 29/08* (2006.01)
*B22F 3/04* (2006.01)
(Continued)

(52) U.S. Cl.
CPC ................ *C22C 29/08* (2013.01); *B22F 3/04* (2013.01); *C22C 1/05* (2013.01); *C22C 1/051* (2013.01);
(Continued)

(58) Field of Classification Search
CPC .. B22F 3/00; B22F 2005/001; B22F 2998/10; C22C 1/00; C22C 1/0425; C22C 1/0433;
(Continued)

(56) References Cited

FOREIGN PATENT DOCUMENTS

| CN | 103266249 A | 8/2013 |
|---|---|---|
| CN | 103614604 A | 3/2014 |

(Continued)

OTHER PUBLICATIONS

CN 103614604 Machine Translation (Year: 2019).*
International Search Report for PCT/CN2015/095050, dated Aug. 10, 2016, ISA/CN.

*Primary Examiner* — Alexandra M Moore
(74) *Attorney, Agent, or Firm* — Yue (Robert) Xu; Apex Attorneys at Law, LLP

(57) ABSTRACT

Disclosed is an alloy drill. Components of the alloy drill are: 14-30 wt % of a binder phase being one or more of Co, Ni, Fe, and Cu; 0.32-9.7 wt % of an additive being one or more of TaC, MoC, Cr3C2, and MnC; and the remainder as a hard phase being WC. In the alloy drill, WC is used as the hard phase to improve its hardness and wear resistance, Cu, Ni, Fe, or Co as the binder phase can improve its anti-corrosion performance and anti-fatigue performance, and TaC, MoC, Cr3C2, or MnC as the additive can further improve its thermal stability and wear resistance. Thus, the alloy drill has superior wear resistance and impact toughness, and also possesses excellent anti-corrosion performance and anti-fatigue performance.

6 Claims, 2 Drawing Sheets

(51) Int. Cl.
    *C22C 1/10*     (2006.01)
    *E21B 10/46*     (2006.01)
    *C22C 1/05*     (2006.01)
    *C22C 19/03*     (2006.01)
    *C22C 29/00*     (2006.01)
    *E21B 10/567*     (2006.01)
    *B23B 27/14*     (2006.01)
    *B22F 5/00*     (2006.01)

(52) U.S. Cl.
    CPC ............ *C22C 1/1084* (2013.01); *C22C 19/03* (2013.01); *C22C 29/005* (2013.01); *E21B 10/46* (2013.01); *E21B 10/567* (2013.01); *B22F 2005/001* (2013.01); *B22F 2998/10* (2013.01); *B23B 27/14* (2013.01); *B23B 2224/20* (2013.01); *B25D 2222/51* (2013.01); *B25D 2250/111* (2013.01)

(58) Field of Classification Search
    CPC ......... C22C 1/045; C22C 1/0458; C22C 1/05; C22C 1/051; C22C 1/053; C22C 9/00; C22C 9/05; C22C 9/06; C22C 19/00; C22C 19/002; C22C 19/005; C22C 19/03; C22C 19/051; C22C 27/04; C22C 29/00; C22C 29/02; C22C 29/08; C22C 32/00; C22C 32/0047; C22C 32/0052; E21B 10/00; E21B 10/02; E21B 10/08; E21B 10/36; E21B 10/42; E21B 10/44; E21B 10/45; E21B 10/46; E21B 10/56; E21B 10/567

See application file for complete search history.

(56) References Cited

FOREIGN PATENT DOCUMENTS

| | | |
|---|---|---|
| JP | 2002120104 A | 4/2002 |
| WO | 9415740 A1 | 7/1994 |

\* cited by examiner

ALLOY DRILL AND MANUFACTURING METHOD THEREOF

CROSS REFERENCE TO RELATED APPLICATIONS

This is a US National Phase application based upon PCT Application No. PCT/CN2015/095050, filed Nov. 19, 2015, which claims the priority of Chinese Patent Application No. 201510719112.7, filed on Oct. 29, 2015, and titled with "ALLOY DRILL AND MANUFACTURING METHOD THEREOF", and the disclosures of which are hereby incorporated by reference.

FIELD

The present invention relates to the field of drill bit technology, specifically to an alloy drill bit and the manufacturing method thereof.

BACKGROUND

Drill bit is an anti-wear part of conventional equipment used in petroleum drilling, geological drilling and tunnel engineering. It usually contacts with rocks, etching solutions and other impurities directly, and achieves the aim of drilling by rubbing, impacting and scouring. Work performance of drill bit directly influences drilling quality, drilling efficiency and drilling cost.

At present, in the field of boring industry and road construction engineering, roller bit and polycrystalline diamond compact (PDC) bit are widely used, but they still have some problems that are hard to be overcome. In the art, roller bit is usually made from conventional tungsten-cobalt alloy. Although conventional tungsten-cobalt alloy has specific corrosion resistance of hard alloy, between the hardness and strength of which poses a contradiction, that is, roller bit cannot combine good wear resistance and impact toughness; therefore, in practice, mechanical properties of which cannot meet the requirements of severe working conditions, which greatly shortens the service life of the roller bit. For PDC bit in the art, cast iron or steel casting are usually chosen as the substrate material, polycrystalline diamond compact are cladded or welded to the surface of the substrate as wear resistance hardface layer. The substrate is generally obtained by casting or machining, then subjected to hardface processing by thermal spraying thereafter. The technology is often complicated and the cost is relatively high. In addition, in practice drilling operation, if there is foreign body at the bottom of the hole, broken gear or hot friction will happen to PDC bit. As the temperature rises, the carcass is burned, and even the brazing layer is melted, resulting in a missing tooth, which affects the penetration rate and accelerates the failure of the drill bit.

Therefore, a drill bit that has good wear resistance and impact toughness as well as good corrosion resistance and fatigue resistance is in urgent need in the art.

SUMMARY

In view of above, the present disclosure aims to provide an alloy drill bit and the manufacturing method thereof, and the drill bit provided by the present disclosure has good wear resistance and impact toughness, as well as good corrosion resistance and fatigue resistance.

The present disclosure provides an alloy drill bit, consisting of:

14 to 30 wt % of a binder phase, which is one or more of Co, Ni, Fe and Cu;
0.32 to 9.7 wt % of an additive, which is one or more of TaC, MoC, $Cr_3C_2$ and MnC; and
a hard phase as balance, which is WC.

Preferably, component of the alloy drill bit is tungsten-cobalt alloy, iron-tungsten alloy or copper-tungsten alloy.

Preferably, component of the tungsten-cobalt alloy is:
9 to 14.5 wt % of Co,
5 to 8 wt % of Ni,
0.35 to 0.6 wt % of TaC,
0.3 to 0.55 wt % of MoC, and
WC as balance.

Preferably, component of the iron-tungsten alloy is:
15 to 20 wt % of Fe,
3.6 to 5.1 wt % of Co,
3.8 to 4.9 wt % of Ni,
0.32 to 0.4 wt % of $Cr_3C_2$, and
WC as balance.

Preferably, component of the copper-tungsten alloy is:
14.3 to 20.5 wt % of Cu,
6.8 to 9.7 wt % of MnC,
4.5 to 6.4 wt % of Ni, and
WC as balance.

Preferably, grain size of the tungsten-cobalt alloy, iron-tungsten alloy and copper-tungsten alloy is from 3 to 10.3 μm.

In the alloy drill bit provided by the present disclosure, WC, as the hard phase, gives the alloy drill bit relative good hardness and wear resistance; Cu, Ni, Fe or Co, as the binder phase, not only gives the alloy drill bit relative good compactness and strength, but also increases corrosion resistance and fatigue resistance of the alloy drill bit; TaC, MoC, $Cr_3C_2$ or MnC, as the additive, further increases high temperature resistance and wear resistance. Therefore, the alloy drill bit provided by the present disclosure has relatively good wear resistance and impact toughness as well as relatively good corrosion resistance and fatigue resistance.

The present disclosure provides a method for preparing the alloy drill bit above, consisting of:

mixing the hard phase, the binder phase and the additive to obtain a mixed material, wherein the hard phase is WC, the binder phase is one or more of Co, Ni, Fe and Cu, and the additive is one or more of TaC, MoC, $Cr_3C_2$ and MnC;

performing cold isostatic pressing molding on the mixed material to obtain a powder compact;

shaping the powder compact to obtain a powder compact of drill bit;

sintering the powder compact of drill bit to obtain the alloy drill bit.

Preferably, after mixing the hard phase, the binder phase and the additive, further consisting of:

grinding, drying and granulating the mixture obtained successively to obtain the mixed material.

Preferably, pressure for the isostatic pressing is from 180 to 280 MPa.

Preferably, temperature for the sintering is from 1430 to 1470° C.

In the method for preparing alloy drill bit provided by the present disclosure, through the combination of the hard phase, the binder phase and the additive, the alloy drill bit obtained by the present disclosure has relatively high wear resistance and impact toughness as well as relatively good corrosion resistance and fatigue resistance. Alloy drill bit prepared by this method has excellent properties, which efficiently prolongs the service life of the drill bit, reducing the replacement frequency of the drill bit during operation process, reducing the cost and increasing the working efficiency.

BRIEF DESCRIPTION OF DRAWINGS

In order to describe the technical solutions in the embodiments of the present disclosure or the art more clearly, the accompanying drawings used in description of the embodiments or the conventional art will be illustrated briefly. It is obvious that the accompanying drawings described hereinafter is merely embodiments of the present disclosure, for one of ordinary skill in the art, other accompanying drawings can also be obtained according to the accompany drawings provided without any creative efforts.

DETAILED DESCRIPTION

Figure 1:
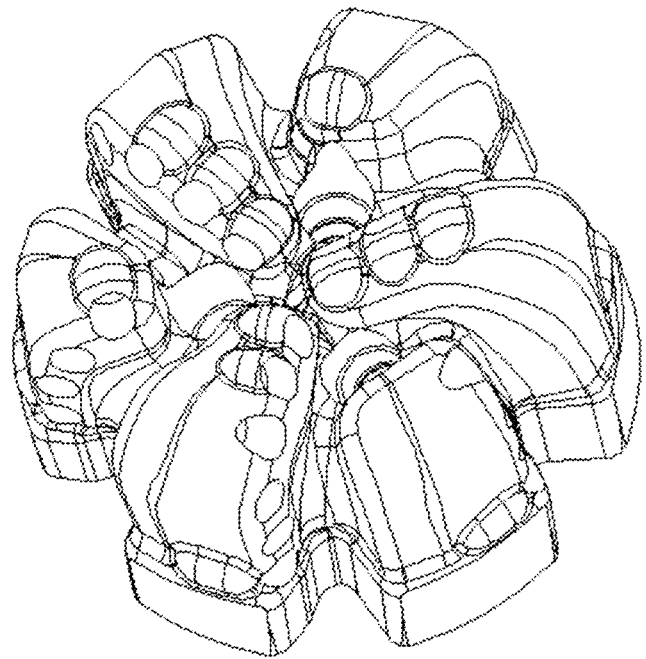
FIG. 1 is the structural representation of the powder compact of the drill bit prepared in Example 1 of the present disclosure.

The technical solutions in the examples of the present disclosure will be described clearly and completely herein in conjunction with the examples of the present disclosure. Apparently, the described examples are only a part of the examples of the present disclosure, rather than all examples. Based on the examples in the present disclosure, all of other examples, made by one of ordinary skill in the art without any creative efforts, fall into the protection scope of the present disclosure.

The present disclosure provides an alloy drill bit, consisting of:

14 to 30 wt % of a binder phase, which is one or more of Co, Ni, Fe and Cu;

0.32 to 9.7 wt % of an additive, which is one or more of TaC, MoC, $Cr_3C2$ and MnC; and a hard phase as balance, which is WC.

In the examples of the present disclosure, the binder phase of the alloy drill bit can be Co and Ni; in other examples, the binder phase of the alloy drill bit can be Fe, Co and Ni; in other examples, the binder phase of the alloy drill bit can be Cu and Ni. In the examples of the present disclosure, when the binder phase of the alloy drill bit is Co and Ni, mass content of the binder phase is from 14 to 22.5 wt %, mass ratio of Co and Ni is (9 to 14.5):(5 to 8). In the examples of the present disclosure, when the binder phase of the alloy drill bit is Fe, Co and Ni, mass content of the binder phase is from 22.4 to 30 wt %, mass ratio of Fe, Co and Ni is (15 to 20):(3.6 to 5.1):(3.8 to 4.9). In the examples of the present disclosure, when the binder phase of the alloy drill bit is Cu and Ni, mass content of the binder phase is from 18.8 to 26.9 wt %, mass ratio of Cu and Ni is (14.3 to 20.5):(4.5 to 6.4).

In the examples of the present disclosure, the additive of the alloy drill bit can be TaC and MoC; in other examples of the present disclosure, the additive of the alloy drill bit can be $Cr_3C_2$ or MnC. In the examples of the present disclosure, when the additive of the alloy drill bit is TaC and MoC, mass content of the additive is from 0.65 to 1.15 wt %, mass ratio of TaC and MoC is (0.35 to 0.6):(0.3 to 0.55). In the examples of the present disclosure, when the additive of the alloy drill bit is $Cr_3C_2$, mass content of $Cr_3C_2$ is from 0.32 to 0.4 wt %. In the examples of the present disclosure, when the additive of the alloy drill bit is MnC, mass content of MnC is from 6.8 to 9.7 wt %.

In embodiments of the present disclosure, component of the alloy drill bit can be tungsten-cobalt alloy, iron-tungsten alloy or copper-tungsten alloy. In embodiments of the present disclosure, component of the tungsten-cobalt alloy is:

9 to 14.5 wt % of Co,
5 to 8 wt % of Ni,
0.35 to 0.6 wt % of TaC,
0.3 to 0.55 wt % of MoC, and
WC as balance.

In the examples of the present disclosure, Co content of the tungsten-cobalt alloy is from 10 to 14 wt %; in other examples, Co content of the tungsten-cobalt alloy is from 11 to 13 wt %; in other examples, Co content of the tungsten-cobalt alloy is from 11.5 to 12.5 wt %. In the examples of the present disclosure, Ni content of the tungsten-cobalt alloy is from 5.5 to 7.5 wt %; in other examples, Ni content of the tungsten-cobalt alloy is from 6 to 7 wt %; in other examples, Ni content of the tungsten-cobalt alloy is from 6.4 to 6.6 wt %. In the examples of the present disclosure, TaC content of the tungsten-cobalt alloy is from 0.4 to 0.55 wt %; in other examples, TaC content of the tungsten-cobalt alloy is from 0.45 to 0.5 wt %; in other examples, TaC content of the tungsten-cobalt alloy is from 0.46 to 0.48 wt %. In the examples of the present disclosure, MoC content of the tungsten-cobalt alloy is from 0.35 to 0.5 wt %; in other examples, MoC content of the tungsten-cobalt alloy is from 0.4 to 0.45 wt %; in other examples, MoC content of the tungsten-cobalt alloy is from 0.42 to 0.43 wt %.

In the examples of the present disclosure, component of the iron-tungsten alloy is:

15 to 20 wt % of Fe,
3.6 to 5.1 wt % of Co,
3.8 to 4.9 wt % of Ni,
0.32 to 0.4 wt % of $Cr_3C_2$, and
WC as balance.

In the examples of the present disclosure, Co content of the iron-tungsten alloy is from 4 to 5 wt %; in other examples, Co content of the iron-tungsten alloy is from 4.2 to 4.8 wt %; in other examples, Co content of the iron-tungsten alloy is from 4.4 to 4.6 wt %. In the examples of the present disclosure, Ni content of the iron-tungsten alloy is from 4 to 4.5 wt %; in other examples, Ni content of the iron-tungsten alloy is from 4.2 to 4.3 wt %. In the examples of the present disclosure, $Cr_3C_2$ content of the iron-tungsten alloy is from 0.34 to 0.38 wt %; in other examples, $Cr_3C_2$ content of the iron-tungsten alloy is from 0.35 to 0.36 wt %.

In the examples of the present disclosure, component of the copper-tungsten alloy is:

14.3 to 20.5 wt % of Cu,
6.8 to 9.7 wt % of MnC,
4.5 to 6.4 wt % of Ni, and
WC as balance.

In the examples of the present disclosure, Cu content of the copper-tungsten alloy is from 15 to 18 wt %; in other examples, Cu content of the copper-tungsten alloy is from 16 to 17 wt %. In the examples of the present disclosure, MnC content of the copper-tungsten alloy is from 7 to 9 wt %; in other examples, MnC content of the copper-tungsten alloy is from 7.5 to 8.5 wt %, in other examples, MnC content of the copper-tungsten alloy is from 7.8 to 8.2 wt %. In the examples of the present disclosure, Ni content of the copper-tungsten alloy is from 5 to 6 wt %; in other examples, Ni content of the copper-tungsten alloy is from 5.2 to 5.8 wt %, in other examples, Ni content of the copper-tungsten alloy is from 5.4 to 5.6 wt %.

In the examples of the present disclosure, grain size of the tungsten-cobalt alloy, iron-tungsten alloy and copper-tungsten alloy is from 3 to 10.3 μm; in other examples, grain size of the tungsten-cobalt alloy, iron-tungsten alloy and copper-tungsten alloy is from 5 to 8 μm; in other examples, grain size of the tungsten-cobalt alloy, iron-tungsten alloy and copper-tungsten alloy is from 6 to 7 μm.

In the examples of the present disclosure, diameter of the alloy drill bit is from 140 to 200 nm; in other examples, diameter of the alloy drill bit is from 150 to 180 nm; in other examples, diameter of the alloy drill bit is from 160 to 170 nm. In the examples of the present disclosure, height of the alloy drill bit is from 80 to 90 mm; in other examples, height of the alloy drill bit is from 82 to 88 mm; in other examples, height of the alloy drill bit is from 84 to 86 mm. The alloy drill bit provided by the present disclosure has a relatively large size.

The present disclosure provides a method for preparing the alloy drill bit according the technical solutions above, consisting of:

mixing the hard phase, the binder phase and the additive to obtain a mixed material, wherein the hard phase is WC, the binder phase is one or more of Co, Ni, Fe and Cu, and the additive is one or more of TaC, MoC, $Cr_3C_2$ and MnC;

performing cold isostatic pressing molding on the mixed material to obtain a powder compact;

shaping the powder compact to obtain a powder compact of drill bit; and sintering the powder compact of drill bit to obtain the alloy drill bit.

In the present disclosure, the hard phase, the binder phase and the additive are mixed to obtain a mixed material, wherein the hard phase is WC, the binder phase is one or more of Co, Ni, Fe, and Cu, and the additive is one or more of TaC, MoC, Cr3C2 and MnC. In the present disclosure, the hard phase, the binder phase and the additive are in accordance with the hard phase, the binder phase and the additive in the technical solutions above, so that they are not repeated herein. In the present disclosure, the hard phase, the binder phase and the additives are used in an amount such that the mass contents of the hard phase, the binder phase and the additive in the mixed material are in accordance with the mass contents of the hard phase, the binder phase and the additive in the alloy for drill bit described in the technical solutions above. This content will not be repeated here.

In the example of the present disclosure, when component of the alloy drill bit is tungsten-cobalt alloy, the method for preparing the alloy drill bit consists of:

mixing WC, Co, Ni, TaC and MoC to obtain a mixed material;

performing cold isostatic pressing molding on the mixed material to obtain a powder compact;

shaping the powder compact to obtain a powder compact of drill bit; and sintering the powder compact of drill bit to obtain an alloy drill bit.

In the present disclosure, when WC, Co, Ni, TaC and MoC are mixed, WC, Co, Ni, TaC and MoC are used in an amount so that the component of the mixed material obtained is in accordance with the component of the tungsten-cobalt alloy in the technical solution above. This content will not be repeated here.

In the example of the present disclosure, when component of the alloy drill bit is iron-tungsten alloy, the method for preparing the alloy drill bit consists of:

mixing WC, Co, Ni, Fe and $Cr_3C_2$ to obtain a mixed material;

performing cold isostatic pressing molding on the mixed material to obtain a powder compact;

shaping the powder compact to obtain a powder compact of drill bit; and sintering the powder compact of drill bit to obtain the alloy drill bit.

In the present disclosure, when WC, Co, Ni, Fe and $Cr_3C_2$ are mixed, WC, Co, Ni, Fe and $Cr_3C_2$ are used in an amount so that the component of the mixed material obtained is in accordance with the component of the iron-tungsten alloy in the technical solution above. This content will not be repeated here.

In the example of the present disclosure, when component of the alloy drill bit is copper-tungsten alloy, the method for preparing the alloy drill bit consists of:

mixing WC, Ni, Cu and MnC to obtain a mixed material;

performing cold isostatic pressing molding on the mixed material to obtain a powder compact;

shaping the powder compact to obtain a powder compact of drill bit; and sintering the powder compact of drill bit to obtain the alloy drill bit.

In the present disclosure, when WC, Ni, Cu and MnC are mixed, WC, Ni, Cu and MnC are used in an amount so that the component of the mixed material obtained is in accordance with the component of the copper-tungsten alloy in the technical solution above. This content will not be repeated here.

In the examples of the present disclosure, the hard phase is in a state of powder. In the examples of the present disclosure, fisher particle size of the hard phase is from 7 μm to 25 μm; in other examples, fisher particle size of the hard phase is from 7 μm to 12 μm; in other examples, fisher particle size of the hard phase is from 20 μm to 25 μm. In the examples of the present disclosure, mass ratio of the hard phase with a particle size of 7 μm to 12 μm and the hard phase with a particle size of 20 μm to 25 μm is (25 to 40):(60 to 75); in other examples, mass ratio of the hard phase with a particle size of 7 μm to 12 μm and the hard phase with a particle size of 20 μm to 25 μm is (30 to 35):(65 to 70).

In the present disclosure, after obtaining the mixed material, the mixed material is subjected to cold isostatic pressing molding to give a powder compact. In the present disclosure, powder compact with high density and high strength can be obtained by employing isostatic pressing molding. In the examples of the present disclosure, pressure for the cold isostatic pressing is from 180 to 280 MPa; in other examples, pressure for the cold isostatic pressing is from 200 to 250 MPa; in other examples, pressure for the cold isostatic pressing is from 220 to 230 MPa. In the examples of the present disclosure, time of the cold isostatic pressing is from 14 to 20 min; in other examples, time of the cold isostatic pressing is from 16 to 18 min. There is no special restriction on operation method of the cold isostatic pressing in the present disclosure, and it can be any of the cold isostatic pressing operation method well-known to one of ordinary skill in the art.

In the present disclosure, after mixing the hard phase, the binder phase and the additive, consisting of:

sequentially grinding, drying and granulating the mixture obtained to obtain the mixed material.

In the examples of the present disclosure, the mixed material gives the alloy drill bit prepared by the method provided by the present disclosure relatively high wear resistance and impact toughness as well as relatively good corrosion resistance and fatigue resistance. In examples of the present disclosure, method for grinding can be wet ball milling. In examples of the present disclosure, ball-to-powder mass ratio in the wet ball milling process can be (3 to 5):1; in other examples, ball-to-powder mass ratio in the wet ball milling process can be (3.5 to 4.5):1; in other examples, ball-to-powder mass ratio in the wet ball milling process can be (3.8 to 4.2):1. In the examples of the present disclosure, grinding ball in the wet ball milling process can be hard alloy. In the examples of the present disclosure, diameter of the grinding ball in the wet ball milling process can be from 5 to 10 mm; in other examples of the present disclosure, diameter of the grinding ball in the wet ball milling process can be 5 mm, 6 mm, 8.5 mm, 9.5 mm or 10 mm. In the examples of the present disclosure, solvent in the wet ball milling process is alcohol. In the examples of the present disclosure, time of the wet ball milling is from 30 to 40 h; in other examples, time of the wet ball milling is from 34 to 36 h.

In the examples of the present disclosure, the drying method is vacuum drying. In the examples of the present disclosure, vacuum degree of the vacuum drying is from 0.06 to 0.1 MPa; in other examples, vacuum degree of the vacuum drying is from 0.07 to 0.08 MPa. In the examples of the present disclosure, temperature for the drying is from 90 to 100° C.; in other examples, temperature for the drying is from 92 to 98° C.; in other examples, temperature for the drying is from 94 to 96° C. In the examples of the present disclosure, time of the drying is from 5 to 8 h; in other examples, time of the drying is from 6 to 7 h. In the examples of the present disclosure, the granulating method is roller granulation.

In the present disclosure, after obtaining the powder compact, the powder compact is subjected to shaping to give a powder compact of the drill bit. In the examples of the present disclosure, shaping method is 5-axis CNC machining. In the examples of the present disclosure, the 5-axis CNC machining is based on Cimatron E 5-axis automatic programming and IMSpost post-processing, also Cimatron and VERICUT software for simulation. First, product graphic is analyzed and programming coordinates are established and adjusted; and then cutting tools and multi-axis blanks required for programming are established. Based on the characteristics of the powder compacts and products, the CNC machining is designed by first machining the bottom of the product and grooving and then the top and middle of the product.

In the present disclosure, after obtaining the powder compact of drill bit, the powder compact of drill bit is subjected to sintering to give an alloy drill bit. In the examples of the present disclosure, equipment for sintering can be pressure sintering furnace. In the examples of the present disclosure, temperature of the sintering is from 1430 to 1470° C.; in other examples, temperature of the sintering is from 1440 to 1460° C. In the examples of the present disclosure, time of the sintering is from 6 to 12 h; in other examples, time of the sintering is from 8 to 10 h. In the examples of the present disclosure, thermal insulation time after the sintering is from 30 to 50 min; in other examples, thermal insulation time after the sintering is from 35 to 45 min.

The density of the alloy drill bit provided by the present disclosure is measured by draining method, and the result shows that the density of the alloy drill bit provided by the present disclosure is from 14 to 15 g/cm$^3$.

The hardness of the alloy drill bit provided by the present disclosure is measured by a Rockwell hardness tester, and the result shows that the hardness of the alloy drill bit provided by the present disclosure is from 85 to 95 HRA.

The bending strength of the alloy drill bit provided by the present disclosure is measured by an universal strength tester using three point bending test, and the result shows that the bending strength of the alloy drill provided by the present disclosure is from 3100 to 3200 MPa.

Normal temperature dry sliding wear testing is carried out on an MM2000 Sliding Wear Testing Machine. Size of sample is 10 mm×10 mm×10 mm; material of grinding ring is 42CrMo (hardness of HRC53) that has subjected to quenching and low temperature tempering; normal loading is 20 Kgf; rotational speed of the grinding ring is 400 r/min; wearing time is 60 min; and total sliding distance is about 3800 m; relative wear resistance (=wear weight loss of the standard sample/wear weight loss of the test sample) is taken as index of wear resistance of material. The relative wear resistance of the alloy drill bit provided by the present disclosure is tested and the result shows that the relative wear resistance of the alloy drill bit provided by the present disclosure is from 78 to 80 (that of 42CrMo steel that has subjected to quenching and low temperature tempering is set as 1).

Corrosion test is carried out in a constant-temperature bath at 20° C. with 0.5 mol/L of hydrochloric acid to test the corrosion resistance of material. 316L stainless steel serves as the control sample, and the corrosion weight loss is measured after 168 h of soaking. Relative corrosion resistance (=corrosion weight loss of the standard sample/corrosion weight loss of the test sample) is taken as index of corrosion resistance of material. The relative corrosion resistance of the alloy drill bit provided by the present disclosure is tested and the result shows that the relative corrosion resistance of the alloy drill bit provided by the present disclosure is from 32 to 35 (that of 316 L stainless steel is set as 1).

All raw materials used in the examples of the present disclosure hereinafter are commercially available.

Example 1

Co, Ni, TaC, MoC and WC were mixed to give a mixture. The mixture contained 12 wt % of Co, 6 wt % of Ni, 0.5 wt % of TaC, 0.5 wt % of MoC, and the balance was WC. In the WC, the mass ratio of the powder with a fisher particle size of 11 μm and the powder with a fisher particle size of 23 μm was 25:75.

The mixture was subjected to wet ball milling for 36 h. In the milling process, ball-to-powder mass ratio was 4:1. The grinded product was subjected to vacuum drying under 0.08 MPa at 95° C. The dried product was subjected to roller granulation to give a mixed material.

The mixed material was subjected to cold isostatic pressing molding at 225 MPa for 16 min to give a powder compact.

Figure 2:
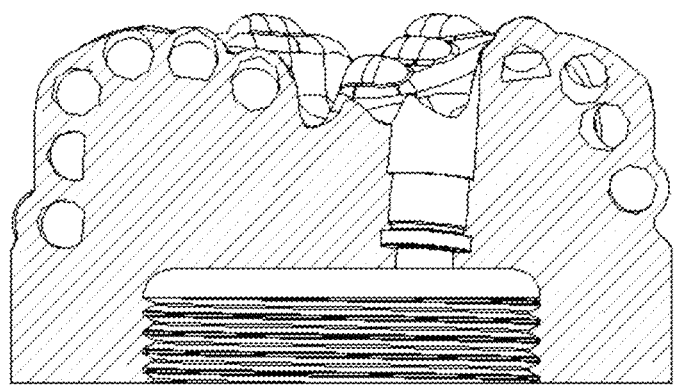
FIG. 2 is the front view of the powder compact of the drill bit prepared in Example 1 of the present disclosure.

The powder compact was subjected to 5-axis CNC machining to give a powder compact of the drill bit. First, 3 oblique holes were drilled at the bottom of the powder compact (section with screw threads), and then the bottom was grooved. The powder compact was rolled over to process the top of the powder compact, and then the middle of the powder compact was processed. Finally, 3 big holes and undercut as well as 30 holes were processed. The shape of the powder compact of the drill bit was shown in FIG. 1 and FIG. 2. FIG. 1 was the structural representation of the powder compact of the drill bit prepared in Example 1 of the present disclosure, and FIG. 2 was the front view of the powder compact of drill bit prepared in Example 1 of the present disclosure.

The powder compact of drill bit was put in a pressure sintering furnace and subjected to high temperature sintering to give the alloy drill bit. The time of sintering was 12 h, the temperature of sintering was 1470° C., and the thermal insulation time after sintering was 30 min.

Figure 3:
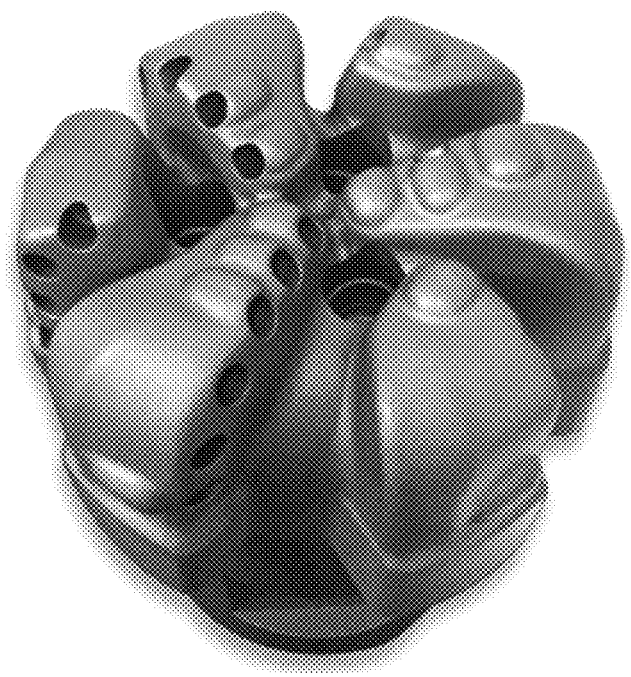
FIG. 3 is a photo of the alloy drill bit provided by Example 1 of the present disclosure.

The alloy drill bit prepared in Example 1 of the present disclosure was shown in FIG. 3. FIG. 3 was a photo of the alloy drill bit provided by Example 1 of the present disclosure. The diameter of the alloy drill bit prepared in Example 1 of the present disclosure was 175 mm, and the height was 87 mm.

According to the methods described in the technical solutions above, density, hardness, bending strength, relative wear resistance and relative corrosion resistance of the alloy drill bit prepared in Example 1 of the present disclosure were tested. The test results showed that the alloy drill bit provided by Example 1 of the present disclosure has a density of 14.30 g/cm$^3$, hardness of 90.5HRA, bending strength of 3100 MPa, relative wear resistance of 79.7 and relative corrosion resistance of 32.8.

Example 2

Cu, Ni, MnC and WC were mixed to give a mixture. The mixture contained 20.5 wt % of Cu, 6.4 wt % of Ni, 9.7 wt % of MnC, and the balance was WC. In the WC, the mass ratio of the powder with a fisher particle size of 12 μm and the powder with a fisher particle size of 25 μm was 40:60.

The mixture was subjected to wet ball milling for 36 h. In the milling process, ball-to-powder mass ratio was 3.5:1. The grinded product was subjected to vacuum drying under 0.08 MPa at 95° C. The dried product was subjected to roller granulation to give a mixed material.

The mixed material was subjected to cold isostatic pressing molding at 250 MPa for 18 min to give a powder compact.

The powder compact was subjected to 5-axis CNC machining to give a powder compact of the drill bit. First, 3 oblique holes were drilled at the bottom of the powder compact (section with screw threads), and then the bottom was grooved. The powder compact was rolled over to process the top of the powder compact, and then the middle of the powder compact was processed. Finally, 3 big holes and undercut as well as 30 holes were processed.

The powder compact of drill bit was put in a pressure sintering furnace and subjected to high temperature sintering to give the alloy drill bit. The time of sintering was 12 h, the temperature of sintering was 1460° C., and the thermal insulation time after sintering was 50 min.

According to the methods described in the technical solutions above, density, hardness, bending strength, relative wear resistance and relative corrosion resistance of the alloy drill bit prepared in Example 2 of the present disclosure were tested. The test results showed that the alloy drill bit provided by Example 2 of the present disclosure has a density of 14.45 g/cm$^3$, hardness of 89.4HRA, bending strength of 3200 MPa, relative wear resistance of 78.5 and relative corrosion resistance of 35.2.

In view of the examples above, the present disclosure provides an alloy drill which consists of: 14 to 30 wt % of a binder phase, wherein the binder phase is one of Co, Ni, Fe and Cu, or a mixture thereof; 0.32 to 9.7 wt % of an additive, wherein the additive is one of TaC, MoC, $Cr_3C_2$ and MnC, or a mixture thereof; the balance is a hard phase, wherein the hard phase is WC. In the alloy drill bit provided by the present disclosure, WC, as the hard phase, gives the alloy drill bit good hardness and wear resistance; Cu, Ni, Fe, or Co, as the binder phase, gives the alloy drill bit good powder compactness and strength, and increases corrosion resistance and fatigue resistance of the alloy drill bit. TaC, MoC, $Cr_3C_2$ or MnC, as the additive, further increases high temperature resistance and wear resistance. Therefore, the alloy drill bit provided by the present disclosure has good wear resistance and impact toughness as well as good corrosion resistance and fatigue resistance.

What is claimed is:

1. An alloy drill bit, consisting of:
   tungsten-cobalt alloy, iron-tungsten alloy or copper-tungsten alloy;
   wherein the tungsten-cobalt alloy consists of:
   9 to 14.5 wt % of Co,
   5 to 8 wt % of Ni,
   0.35 to 0.6 wt % of TaC,
   0.3 to 0.55 wt % of MoC, and
   WC as balance;
   wherein the iron-tungsten alloy consists of:
   15 to 20 wt % of Fe,
   3.6 to 5.1 wt % of Co,
   3.8 to 4.9 wt % of Ni,
   0.32 to 0.4 wt % of $Cr_3C_2$, and
   WC as balance;
   wherein the copper-tungsten alloy consists of:
   14.3 to 20.5 wt % of Cu,
   6.8 to 9.7 wt % of MnC,
   4.5 to 6.4 wt % of Ni, and
   WC as balance.

2. The drill bit according to claim 1, wherein grain size of the tungsten-cobalt alloy, iron-tungsten alloy and copper-tungsten alloy is from 3 to 10.3 μm.

3. A method for preparing the alloy drill bit according to claim 1,
   wherein the alloy drill bit consists of tungsten-cobalt alloy, the method for preparing the alloy drill bit comprises:
   mixing WC, Co, Ni, TaC and MoC to obtain a mixed material,
   performing cold isostatic pressing molding on the mixed material to obtain a powder compact,
   shaping the powder compact to obtain a powder compact of drill bit, and
   sintering the powder compact of drill bit to obtain an alloy drill bit; or
   wherein the alloy drill bit consists of iron-tungsten alloy, the method for preparing the alloy drill bit comprises:
   mixing WC, Co, Ni, Fe and $Cr_3C_2$ to obtain a mixed material,
   performing cold isostatic pressing molding on the mixed material to obtain a powder compact,
   shaping the powder compact to obtain a powder compact of drill bit, and
   sintering the powder compact of drill bit to obtain the alloy drill bit; or
   wherein the alloy drill bit consists of copper-tungsten alloy, the method for preparing the alloy drill bit comprises:
   mixing WC, Ni, Cu and MnC to obtain a mixed material,
   performing cold isostatic pressing molding on the mixed material to obtain a powder compact,
   shaping the powder compact to obtain a powder compact of drill bit, and
   sintering the powder compact of drill bit to obtain the alloy drill bit.

4. The method according to claim 3, wherein after mixing WC, Co, Ni, TaC and MoC, after mixing WC, Co, Ni, Fe and $Cr_3C_2$, or after mixing WC, Ni, Cu and MnC, the method further comprises:
   sequentially grinding, drying and granulating the mixture obtained to obtain the mixed material.

5. The method according to claim 3, wherein pressure for the cold isostatic pressing molding is from 180 to 280 MPa.

6. The method according to claim 3, wherein temperature for the sintering is from 1430 to 1470° C.

* * * * *